(12) United States Patent
Mizobata (10) Patent No.: US 6,760,382 B1
(45) Date of Patent: Jul. 6, 2004

(54) DIGITAL COMMUNICATION SYSTEM, TRANSMITTER, AND DATA SELECTOR

(75) Inventor: Norihiko Mizobata, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/402,179

(22) PCT Filed: Mar. 27, 1998

(86) PCT No.: PCT/JP98/01417
§ 371 (c)(1),
(2), (4) Date: Feb. 4, 2000

(87) PCT Pub. No.: WO98/44683
PCT Pub. Date: Oct. 8, 1998

(30) Foreign Application Priority Data

Apr. 1, 1997 (JP) ............................................. 9-82526

(51) Int. Cl.⁷ ............................................. H04L 27/00
(52) U.S. Cl. ....................... 375/259; 375/144; 375/148; 725/25
(58) Field of Search ............................... 375/144, 259, 375/148; 370/392, 476, 389; 380/279; 725/93, 31, 25

(56) References Cited

U.S. PATENT DOCUMENTS

| 4,369,443 A | * | 1/1983 | Giallanza et al. | .......... 340/7.46 |
| 5,093,659 A | * | 3/1992 | Yamada | .................... 340/7.43 |
| 5,548,532 A | | 8/1996 | Menand et al. | ............. 370/477 |
| 2003/0005434 A1 | * | 1/2003 | Deiss et al. | .................... 725/25 |

FOREIGN PATENT DOCUMENTS

| JP | 61-35645 | 2/1986 |
| JP | 61-224543 | 10/1986 |
| JP | 4-343543 | 11/1992 |
| JP | 7-250086 | 9/1995 |

* cited by examiner

*Primary Examiner*—Stephen Chin
*Assistant Examiner*—Guillermo Munoz
(74) *Attorney, Agent, or Firm*—Wenderoth, Lind & Ponack, L.L.P.

(57) ABSTRACT

A digital communication system comprises a transmitter for sequentially transmitting predetermined format data; and a plurality of receivers 102 each including a data selecting apparatus 104 for selecting required data from received data group and outputting selected data. The transmitter transmits data to the receivers in one of a first transmission mode having group destination directing information indicating that the data is to be transmitted to a receiving group consisting of predetermined receivers of the plurality of receivers, group specifying information for specifying a receiving group of receiving groups to which the data is to be transmitted, and in-group identification information for identifying a receiver in an arbitrary receiving group to which the data is to be transmitted, a second transmission mode having the group destination directing information and the group specifying information are included in the data, and a third transmission mode having the group destination directing information.

6 Claims, 5 Drawing Sheets

DIGITAL COMMUNICATION SYSTEM, TRANSMITTER, AND DATA SELECTOR

This application is the U.S. national stage of PCT/JP98/01417, filed Mar. 27, 1998.

TECHNICAL FIELD

The present invention relates to a digital communication system, a transmitter, and a data selecting apparatus and, more particularly to a digital communication system, a transmitter, and a data selecting apparatus, in which data is transmitted to many receiver groups for each receiver or for each receiving group comprising specified receivers.

BACKGROUND ART

In recent years, in many cases, video data, audio data or other data is transmitted or stored in the form of digital data. In such cases, these data is generally divided into data such as packets having a data structure comprising plural fields, to be transmitted or stored. Also, in some cases, plural pieces of data is made into a packet, and then packets are multiplexed to be transmitted through a transmission medium or to be stored in a storage medium. MPEG system standard is a standard for a data structure and multiplexing for this case, and data is transmitted or stored by a method according to a packet data structure according to this standard.

Conventionally, in a system in which such packet data is multiplexed, equipment which receives data is adapted to select data to-be-received from the multiplexed packet data. By way of example, a method for transmitting data to each receiver and selecting data in each receiver in digital broadcasting using a data multiplexing method according to MPEG system standard will now be briefly described in brief.

In digital broadcasting, when key information used for decrypting encrypted video or audio data or an electric mail is transmitted, it is sometimes necessary that data ((hereinafter referred to as "EMM" (Entitlement Management message) data) be transmitted to specified receivers individually. In this case, a data structure termed "section" defined in MPEG system standard is employed. The section data used for transmitting the EMM data, comprises a field of "table identifier" indicating that type of corresponding data is the EMM data, a field indicating the number of a destination receiver, and a field which contains data to-be-transmitted.

The receiver which receives such data is provided with a data selecting apparatus for selecting required data. The data selecting apparatus contains the table identifier indicating the EMM data and a receiver number inherent to the receiver.

When the receiver receives the section data, the table identifier is taken out of the received data to check whether this indicates the EMM data. When this indicates the EMM data, a field of the receiver number is taken out of the received data to check whether this matches the receiver number inherent to the receiver. When a match is found between them, the data selecting apparatus selects and outputs this section data, whereby only data for the receiver can be selected.

By the way, recently, in order to send a variety of information with flexibility and only to desired receivers, it is required that receivers be grouped and data be sent to each group besides sending information to receivers individually. It is also required that the same data be sent to all the receivers simultaneously. Further, it is necessary to select receivers being specially served under a receiving contract and send data only to these receivers simultaneously.

However, in the transmission method of the EMM data and the data selecting method according to a prior art, since the data to-be-transmitted has a structure in which the information indicating the EMM data is stored in the table identifier field, and the number of the destination receiver is stored in the receiver number field, at the receiver side, whenever the table identifier field indicates the EMM data, it is checked whether the value of the receiver number field matches the receiver number of itself, and only when there is a match between them, the EMM data is selected and received.

With a data structure in which a receiver has a receiver number uniquely determined for each receiver, data is sent to only one receiver specified by a transmission end, and it is therefore impossible to simultaneously send data to a receiver group comprising plural receivers or on a contract broadcasting service basis. Hence, when individual data is sent for the receiver group or on the broadcasting service basis, it is necessary to specify receivers one by one and sequentially send the data to them. So, one transmission end requires several hundreds thousand to several millions of receivers, and accordingly, the method in which the data is sequentially sent to the receivers specified one by one, requires enormous data transmission bandwidth for flexible data transmission to the receivers. With a restricted data transmission bandwidth for broadcasting, flexible data transmission adapted to various services or in response to users' demands is not realized, and thereby quality of service is degraded.

In Japanese Published Patent Application (No. Hei. 7-143117), there is disclosed a communication terminal in which a service group number stored in a receiver which has a right to receive a program is compared to a service group number specified in transmitted program data and when a match is found between them, the program is received.

In this communication terminal, when information destined for an individual ID is received, detection of match of service type numbers is first conducted, and decision on match of the individual ID is then conducted, which increases the amount of processing required for deciding whether the information destined for the individual ID can be received.

The present invention is conceived in view of the background art, and an object of the present invention is to provide a digital communication system in which data is simultaneously sent to all receivers or a prescribed receiver group, as well as to specified receivers, and a transmitter and a data selecting apparatus used in this system.

DISCLOSURE OF THE INVENTION

According to one aspect of the present invention, there is provided a digital communication system comprising: a transmitter for sequentially transmitting predetermined format data; and a plurality of receivers each including a data selecting apparatus for selecting required data from received data group and outputting selected data, wherein the transmitter transmits data to the receivers in one of a first transmission mode in which group destination directing information indicating that the data is to be transmitted to a receiving group consisting of predetermined receivers of the plurality of receivers, group specifying information for specifying a receiving group of receiving groups to which the data is to be transmitted, and in-group identification information for identifying a receiver in an arbitrary receiving group to which the data is to be transmitted, are included in the data, a second transmission mode in which the group destination directing information and the group specifying information are included in the data, and a third transmission mode in which the group destination directing information is included in the data.

According to another embodiment of the present invention, in the digital communication system of the earlier embodiment, the transmitter includes data structuring means for structuring data to be transmitted, and the data selecting apparatus includes: parameter storage means for prestoring plural parameters which are to be compared to the group destination directing information, the in-group identification information, and the group specifying information; correspondence pattern detecting means for comparing the information stored in the data to the parameters, respectively, to detect correspondence patterns; and output means for selecting the required data according to the correspondence patterns detected by the correspondence pattern detecting means and outputting the selected data.

According to another embodiment of the present invention, in the digital communication system of the above embodiment, the group destination directing information includes a group destination number indicating that the data to be transmitted is destined for a group when the data to be transmitted is destined for the group, the group destination directing information includes a specified receiver destination number indicating that the data to be transmitted is destined for a specified receiver when the data to be transmitted is destined for the specified receiver, the parameter storage means prestores a first parameter to be compared to the group destination number, a second parameter to be compared to the specified receiver destination number and the in-group identification information, and a third parameter to be compared to the group specifying information, the correspondence pattern detecting means detects one of first and second correspondence patterns in such a way that the first correspondence pattern is detected when the specified receiver destination number and the in-group identification information match the second parameter and the group specifying information matches the third parameter in the first transmission mode, and the second correspondence pattern is detected when the group destination number matches the first parameter and the group specifying information matches the third parameter in the second transmission mode, and the output means selects the required data according to one of the first and second correspondence patterns and outputs the selected data.

According to another embodiment of the present invention, in the digital communication system of the above embodiment, the group destination directing information includes a number for specifying all receivers when the data to be transmitted is destined for the all receivers, the parameter storage means prestores a fourth parameter to be compared to the number for specifying all receivers, the correspondence pattern detecting means detects a third correspondence pattern when the number for specifying all receivers matches the fourth parameter in the third transmission mode, and the output means selects the required data according to the third correspondence pattern and outputs the selected data.

According to another embodiment of the present invention, in the digital communication system of the above embodiment, the group destination directing information includes a special group number when the data to be transmitted is destined for all receivers which belong to a special group, when the data to be transmitted is destined for all receivers which belong to the special group, the parameter storage means prestores a fourth parameter to be compared to the special group number, the correspondence pattern detecting means detects a fourth correspondence pattern when the special group number matches the fourth parameter in the third transmission mode, and the output means selects the required data according to the fourth correspondence pattern and outputs the selected data.

In the digital communication system so constructed, data can be transmitted to a specified receiver, a predetermined receiving group, all receivers, or all receivers which belong to a special group, and selection of data in the receiver is performed with a small-scale circuit.

According to another embodiment of the present invention, there is provided a transmitter which is used in a digital communication system wherein data is structured to be in a predetermined format and is transmitted to a plurality of receivers, including: data structuring means for structuring data to be transmitted in one of a first data transmission mode in which group destination directing information indicating that the data is to be transmitted to a receiving group consisting of predetermined receivers of the plurality of receivers, group specifying information for specifying a receiving group of receiving groups to which the data is to be transmitted, and in-group identification information for identifying a receiver in an arbitrary receiving group to which the data is to be transmitted, are included in the data, a second data transmission mode in which the group destination directing information and the group specifying information are included in the data, and a third data transmission mode in which the group destination directing information is included in the data.

According to another embodiment of the present invention, in the transmitter of the above embodiment the group destination directing information in the first transmission mode includes a specified receiver destination number indicating that the data to be transmitted is destined for a specified receiver when the data to be transmitted is destined for the specified receiver.

According to another embodiment of the present invention, in the transmitter of an above embodiment, the group destination directing information in the second transmission mode includes a group destination number indicating that the data to be transmitted is destined for a group, when the data to be transmitted is destined for the group.

According to another embodiment of the present invention, in the transmitter of an above embodiment, the group destination directing information in the third transmission mode includes a number for specifying all receivers indicating that the data to be transmitted is destined for all receivers, when the data to be transmitted is destined for the all receivers.

According to another embodiment of the present invention, in the transmitter of an above embodiment, the group destination directing information in the third transmission mode includes a special group number indicating that the data to be transmitted is destined for all receivers which belong to a special group, when the data to be transmitted is destined for the all receivers which belong to the special group.

According to another embodiment of the present invention, there is provided a data selecting apparatus built in a receiver in a digital communication system, which is supplied with predetermined format data as inputs and selects required data from input data group and outputs selected data, and the apparatus comprises: parameter storage means for prestoring plural parameters which are to be compared to group destination directing information in the data indicating that the data to be transmitted is destined for a receiving group consisting of predetermined receivers of the plurality of receivers, group specifying information in the data for specifying a receiving group of receiving groups to which the data is to be transmitted, and in-group identification information in the data for identifying a receiver in an arbitrary receiving group to which the data is to be transmitted; correspondence pattern detecting means for comparing the information stored in the data to the parameters, respectively, to detect correspondence patterns; and output means for selecting the required data according to the correspondence patterns detected by the correspondence pattern detecting means and outputting the selected data.

According to another embodiment of the present invention, in the data selecting apparatus of the above embodiment, the group destination directing information includes a group destination number indicating that the data to be transmitted is destined for a group when the data to be transmitted is destined for the group, the group destination directing information includes a specified receiver destination number indicating that the data to be transmitted is destined for a specified receiver when the data to be transmitted is destined for the specified receiver, the parameter storage means prestores a first parameter to be compared to the group destination number, a second parameter to be compared to the specified receiver destination number and the in-group identification information, and a third parameter to be compared to the group specifying information, the correspondence pattern detecting means detects one of first and second correspondence patterns in such a way that the first correspondence pattern is detected when the specified receiver destination number and the in-group identification information match the second parameter and the group specifying information matches the third parameter, and the second correspondence pattern is detected when the group destination number matches the first parameter and the group specifying information matches the third parameter, and the output means selects the required data according to one of the first and second correspondence patterns and outputs the selected data.

In the data selecting apparatus so constructed, in the specified receiver, predetermined receivers which belong to the specified receiving group, all receivers, or the receivers which belong to the special group, selection of the transmitted data can be performed. Simultaneously, selection of the data in the receiver is performed with a small-scale circuit.

BEST MODE FOR CARRYING OUT THE INVENTION

Now, a preferred embodiment of the present invention will be described.

Figure 1:
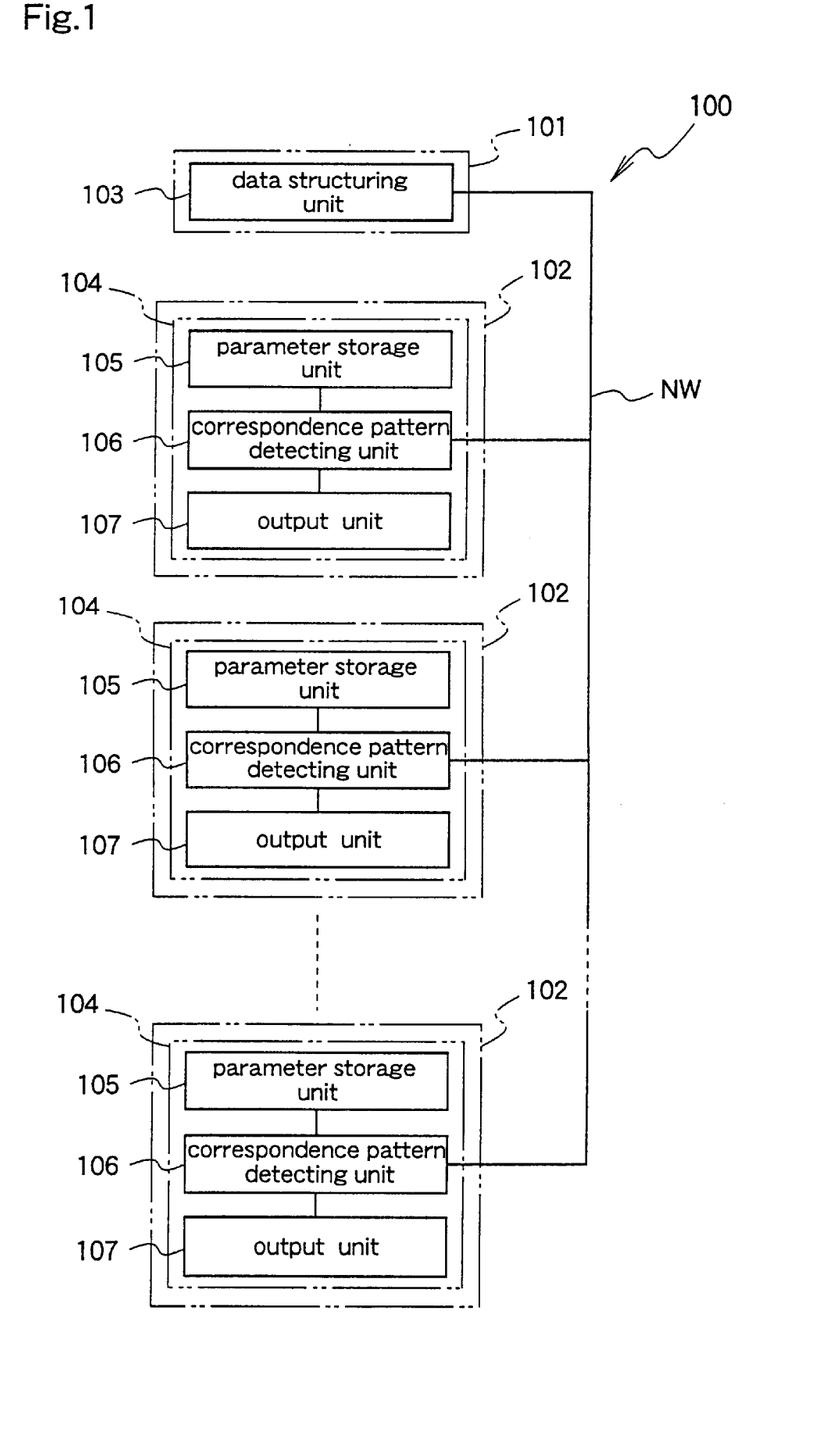
FIG. 1 is a diagram showing a communication system according to an embodiment of the present invention.

FIG. 1 illustrates a digital communication system 100 of the present invention. The communication system 100 comprises a transmitter 101, and a receiver 102 for receiving digital data transmitted from the transmitter 101. The digital communication system 100 is a digital broadcasting system, for example, and comprises one transmitter 101 to many receivers 102, the transmitter 101 being connected to each of the receivers 102 through a communication network NW. Although the communication network NW is wire herein, it may be wireless.

Figure 8:
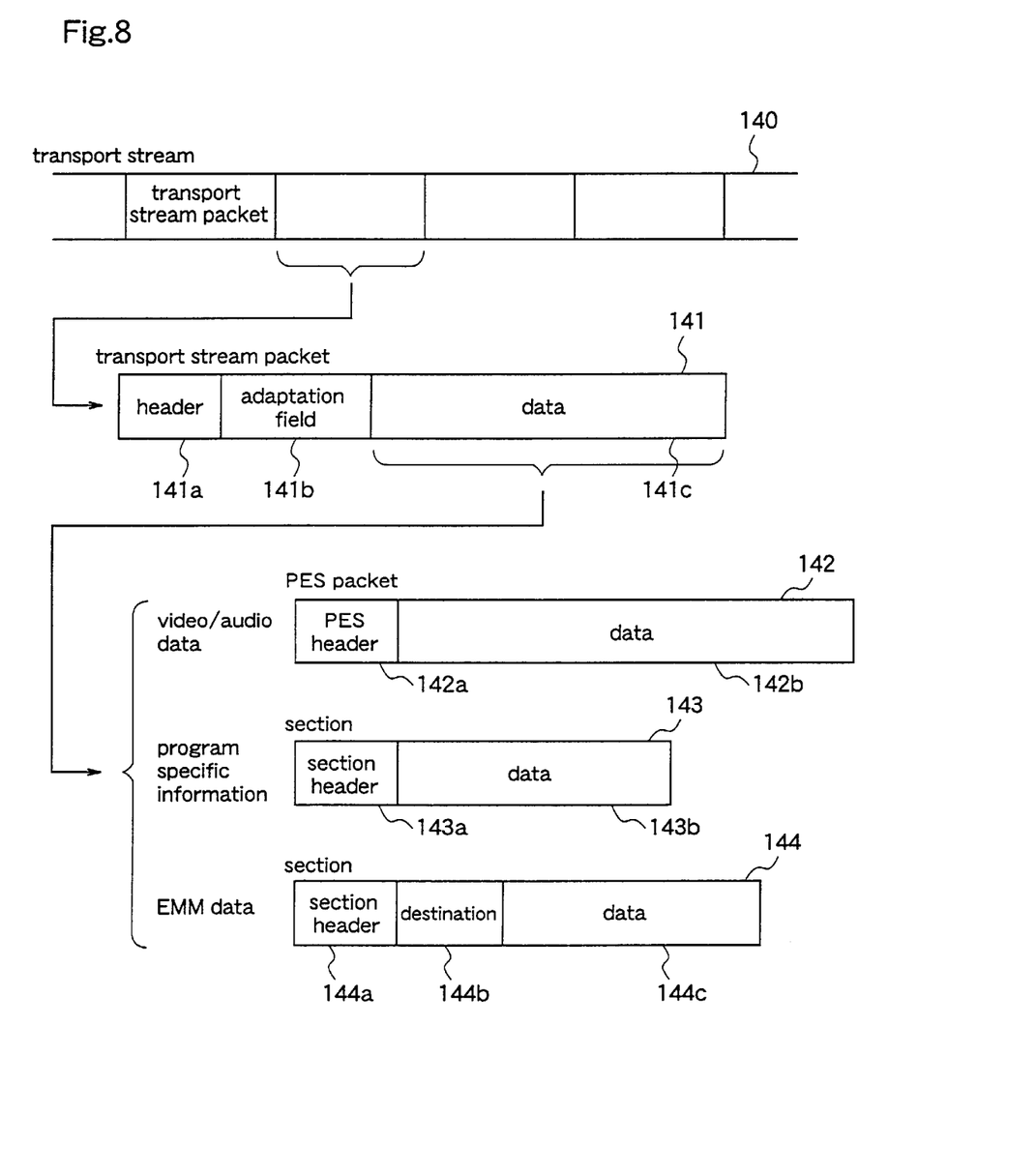
FIG. 8 is a diagram showing a data format of the embodiment of the present invention.

In general, as a data format of data transmitted through the network NW, a "transport stream" defined in MPEG system standard is employed. The transport stream is a data format in which video or audio, program specific information, EMM data, and so forth are multiplexed in packets. The transport stream is illustrated in FIG. 8. A transport stream 140 is composed of transport streampackets 141 of a fixed length. The transport stream packets 141 each comprises a header 141a, an adaptation field 141b, and data part 141c, and in the data part 141c, video or audio data and so forth are stored. The video or audio data is first stored in a data format illustrated as a PES packet 142, and then stored in the transport stream packet 141. The program specific information or the EMM data is first stored in data formats illustrated as section data, and then stored in the transport stream packet 141. The PES packet 142 comprises a header 142a and a data part 142b. PES packets are sometimes stored in plural transport stream packets. The section data 143 comprises a header 143a and a data part 143b, and the section data 144 comprises a header 144a, a destination part 144b, and a data part 144c and plural pieces of section data may be stored in a transport stream packet, or one section data may be stored in plural transport stream packets. The section data 144 which contains the EMM data, also contains destination information indicating a receiver by which the EMM data is to be received.

The transmitter 101 comprises a data structuring unit 103. The data structuring unit 103 is used for structuring data to-be-transmitted to be in section data format according to MPEG system standard. Each receiver 102 includes a data selecting apparatus 104 for selecting data. The data selecting apparatus 104 comprises a parameter storage unit 105 for storing four types of parameters, a correspondence pattern detecting unit 106 for receiving data and comparing the data to the parameter stored in the parameter storage unit 105 to detect a correspondence pattern of them, and an output unit 107 for selecting data according to the correspondence pattern detected by the correspondence patter detecting unit 106 and outputting selected data.

The parameters stored in the parameter storage unit 105 can be set by an IC card and the like provided by a transmitting end when the user subscribes to the digital broadcasting system.

The present invention is characterized in that data is broadcast in any of four manners below. That is, in the digital communication system 100, a signal transmitted from the transmitter 101 is:

(1) received only by a specified receiver 102;.
(2) received only by a specified receiving group comprising plural receivers 102;
(3) received by all receivers 102; or
(4) received by a specified special group.

This will now be described in detail.

FIGS. 2 through 5 illustrate a data structure of EMM data 108 to-be-transmitted. Referring to these figures, these EMM data 108 is data which has been structured by the data structuring unit 103 in the transmitter 101, and be in a section data format according to MPEG system standard. The EMM data 108 comprises a table ID field 109, a first field 110, and a second field 111.

The table ID field 109 is composed of 8 bits and indicates what type of data corresponding section data contains. In this embodiment, in the table ID field 109, "84h" (hereinafter hexadecimal number is represented by "h" at its end) is stored. The "84h" indicates that the section data is the EMM data 108 transmitted to a specified receiver 102.

The first field 110 is composed of 16 bits and contains group destination directing information indicating that the EMM data 108 is destined for a receiving group including a prescribed receiver 102 of plural receivers, and indicating that which receiving group the EMM data 108 is transmitted to. Further, in-group identification information indicating that the EMM data 108 is destined for a specified receiver 102 in an arbitrary group is stored in the first field 110 as necessary.

Figure 2:
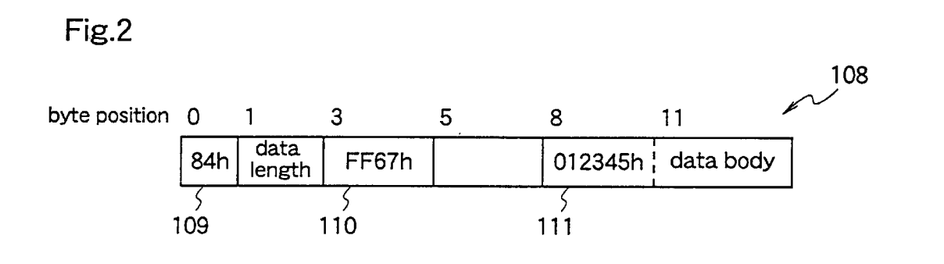
FIG. 2 is a diagram showing a structure of data which is transmitted to a specified receiver of the embodiment.

More specifically, in a case where the EMM data 108 is destined for the specified receiver 102, to lower 1 byte of the receiver unique number as the in-group identification information, a specified receiver destination number "FFh" indicating that the EMM data 108 is destined for a specified receiver as the group destination directing information is added, and the resulting number is set in the first field of the EMM data 108 (see FIG. 2). For example, when a receiver unique number of 4 bytes is "0 1 2 3 4 5 6 7h", "FF67h" is set in the first field 110 of the EMM data 108. This means that a receiver 102 of a receiver unique number whose lower 1 byte is "67h" in an arbitrary receiving group is specified as destination. In this case, "an arbitrary receiving group" is not a specified one but is any of receiving groups. A receiving group is specified by the group specifying information stored in the second field 111.

Figure 3:
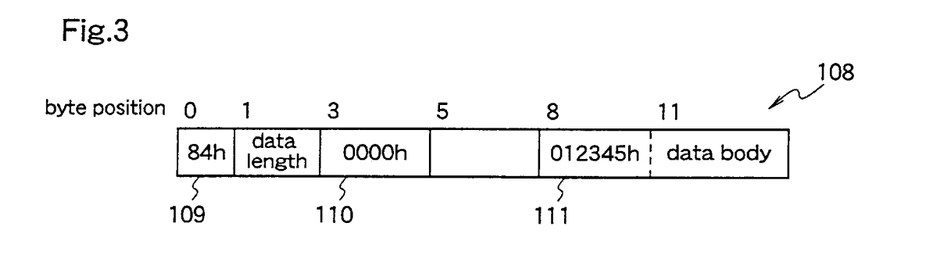
FIG. 3 is a diagram showing a structure of data which is transmitted to a specified group of the embodiment.

When the EMM data 108 is transmitted to a receiving group, a group destination number "0000h" is set as the group destination directing information (see FIG. 3). This indicates that the EMM data 108 is destined for a receiving group comprising prescribed receivers of the plural receivers rather than individual receivers.

Figure 4:
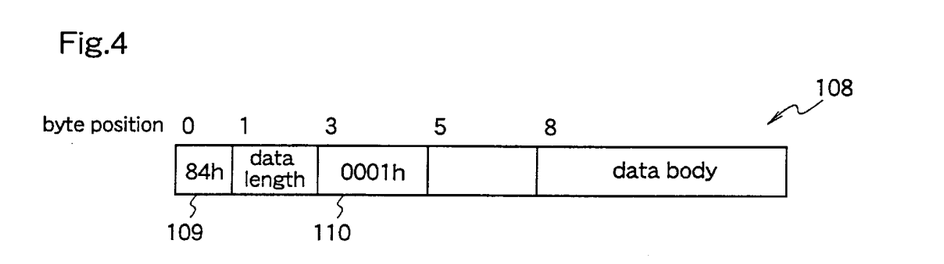
FIG. 4 is a diagram showing a structure of data which is transmitted to all receivers of the embodiment.

When the EMM data 108 is destined for all receivers 102, a number for specifying all receivers "0001h" is set as the group destination directing information (see FIG. 4).

Figure 5:
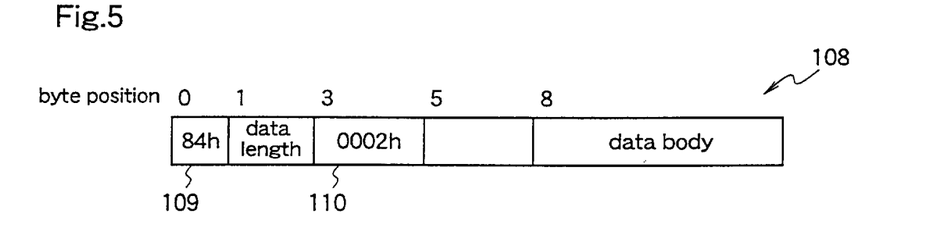
FIG. 5 is a diagram showing a structure of data which is transmitted to a special group of the embodiment.

When the EMM data 108 is destined for a special group, a special group number "0002h" is set as the group destination directing information (see FIG. 5). This indicates that the EMM data 108 is transmitted to all receivers 102 which belongs to a special group. It should be noted that the special receiving group comprises receivers 102 under a contract of a special broadcasting service.

The second field 111 is composed of a part of data bytes of the EMM data 108. In this embodiment, first 3 bytes of the data bytes are used. In the second field 111, the group specifying information for specifying a receiving group to which the EMM data 108 is to be transmitted is stored. When the EMM data 108 is destined for a specified receiving group, a group specifying number, for example, "012345h" is set as the group specifying information (see FIGS. 2 and 3). The group specifying number "012345h" indicates that the EMM data 108 is transmitted to a receiver in a specified receiving group in which upper 3 bytes of the receiver unique number corresponds to the group specifying number "012345h".

As shown in FIG. 2, lower 1 byte of the receiver unique number as the in-group identification information and the group specifying number are set, resulting in the EMM data 108 for a receiver 102 specified by the in-group identification information in a receiving group specified by the group specifying number. As shown in FIG. 3, the group destination number "0000h" and the group specifying number "012345h" are set, resulting in the EMM data 108 for all receivers 102 which belong to a receiving group specified by the group specifying number. As shown in FIG. 4, the number specifying all receivers "0001h" is set, resulting in the EMM data 108 for all receivers 102 irrespective of receiving groups. As shown in FIG. 5, a special group number "0002h" is set so that the EMM data 108 is destined for every receiver 102 in a special receiving group under a contract of special service. As shown in FIGS. 4 and 5, it is not necessary to set the group specifying information.

TABLE 1 shows setting for each broadcasting.

TABLE 1

| Field Destination | First field 110 | Second field 111 |
| --- | --- | --- |
| Individual Receiver | FF00h + Receiver unique number lower 1 byte | Receiver unique number upper 3 bytes |
| Receiving Group | 0000h (group destination number) | Receiver unique number upper 3 bytes |
| All Receivers | 0001h (number for specifying all receivers) | — |
| Service Group | 0002h (special group number) | — |

Figure 6:
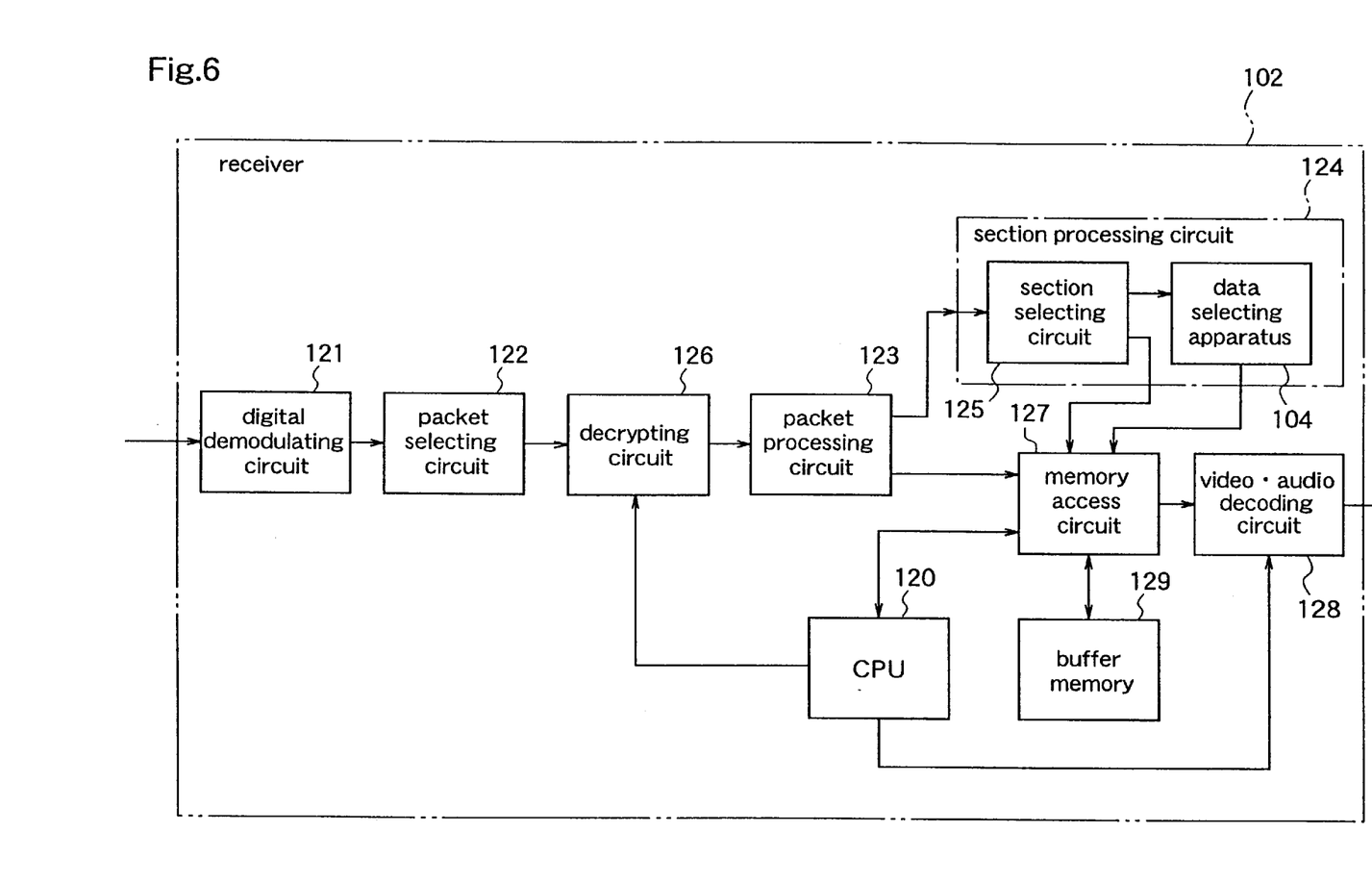
FIG. 6 is a diagram showing construction of a receiver in the communication system according to the embodiment of the present invention.

Subsequently, the receiver 102 will be described in detail. FIG. 6 illustrates a construction of the receiver 102. Received broadcast data, for example, data modulated by QPSK (quadrature phase shift keying), is first demodulated by a digital demodulating circuit 121, and then a packet to-be-received is selected by a packet selecting circuit 122. A packet which contains video or audio data is decrypted by a decrypting circuit 126 when the packet has been encrypted and receiving of this is authorized because key information for decrypting encryption is given. Then, the video or audio data is taken out of the packet by a packet processing circuit 123, and then temporarily stored in a buffer memory 129 by a memory access circuit 127. Then the video and audio data are sent to a video and audio decoding circuit 128 at time when they are to be reproduced and displayed, to be decompressed therein, and the resulting restored video and audio data is output as NTSC or PAL video signals, to be displayed. From a packet which contains section data such as the program specific information other than the EMM data, the section data is taken out of by the packet processing circuit 123, and sent to a section processing circuit 124. In the section processing circuit 124, section data to-be-received other than the EMM data is selected by a section selecting circuit 125, and then sent to the memory access circuit 127, to be stored in the buffer memory 129. The section data stored in the buffer memory 129 is used by a CPU 120 for constructing a program table or a selecting a program for the receiver.

Meanwhile, a packet which contains the EMM data 108 is selected by the packet processing circuit 123, and sent to the section processing circuit 124. In the section processing circuit 124, the section selecting circuit 125 and a data selecting apparatus 104 perform selection according to the information stored in respective fields 109, 110, and 111 of the EMM data 108, and then send the EMM data to-be-received through the memory access circuit 127 to the buffer memory 129, to be stored therein. In a case where the EMM data stored in the buffer memory 129 is information used for decrypting encrypted video or audio data which can be received, the CPU 120 reads this and creates key information, and sets the key information in the decrypting circuit 126, thereby allowing video or audio data to be decrypted. In a case where the EMM data received and stored in the buffer memory 129 is mail information, this is read by the CPU 120 in accordance with operation of the user, and then sent to the video and audio decoding circuit 128, to be displayed.

Figure 7:
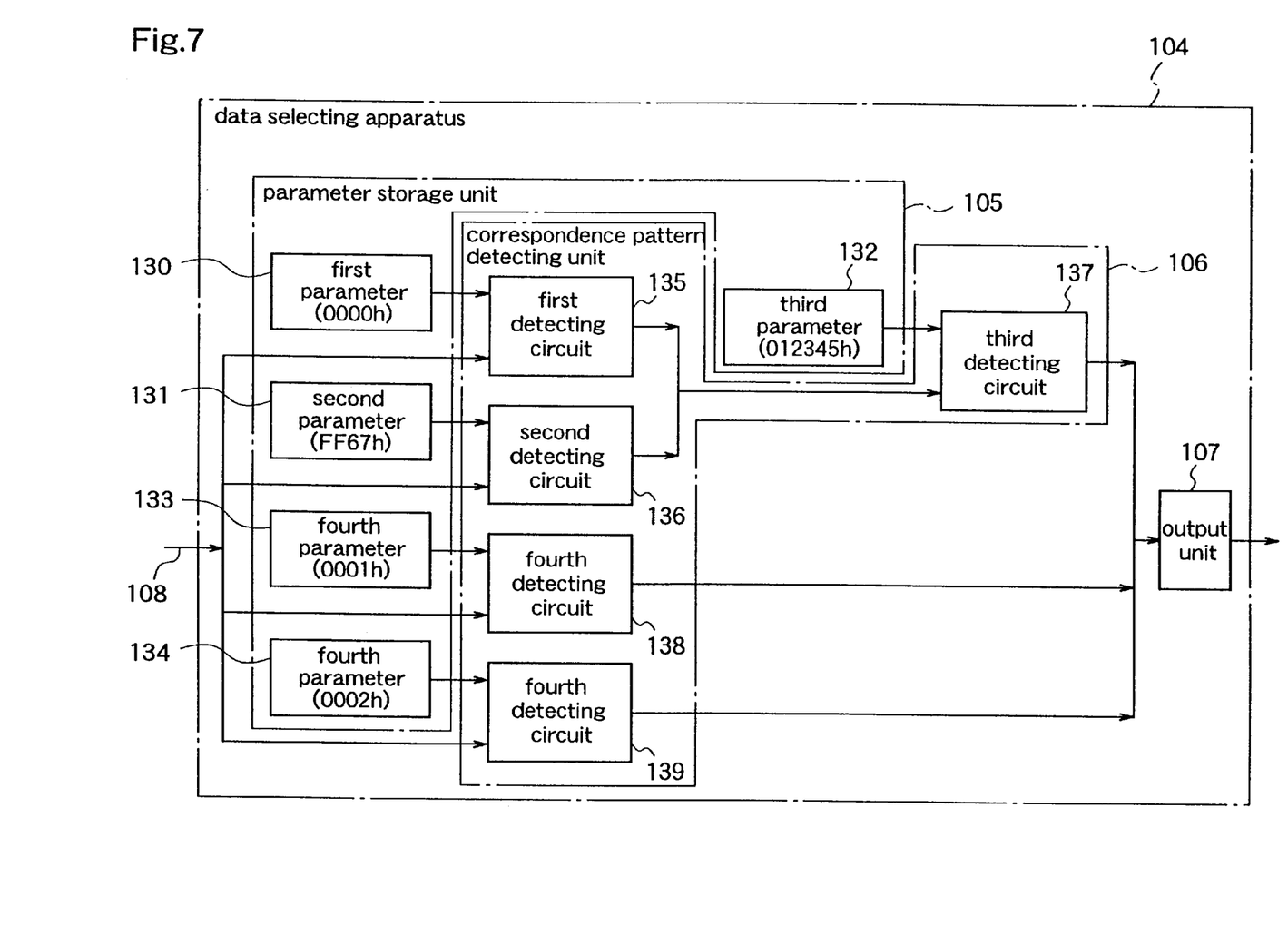
FIG. 7 is a diagram showing a data selecting apparatus in the communication system according to the embodiment of the present invention.

FIG. 7 illustrates operation of the data selecting apparatus 104 shown in FIG. 6. Referring to FIGS. 1 and 7, the parameter storage unit 105 of the data selecting apparatus 104 (see FIG. 1) stores first to fourth parameters. In this embodiment, "0000h", "FF67h" and "012345h" are stored as the first parameter 130, the second parameter 131, and the third parameter 132, respectively. In addition, "0001h" and "0002h" are stored as the fourth parameters 133 and 134, respectively.

The correspondence pattern detecting unit 106 of the data selecting apparatus 104 (see FIG. 1) comprises a first detecting circuit 135, a second detecting circuit 136, a third detecting circuit 137, and fourth detecting circuits 138 and 139.

The first detecting circuit 135 compares the first parameter 130 "0000h" to the information stored in the first field 110 of the EMM data 108, to detect a match/mismatch between them, and when the match is found, the circuit 135 outputs the input EMM data 108.

The second detecting circuit 136 compares the second parameter 131 "FF67h" to the information stored in the first field 110 of the EMM data 108, to detect a match/mismatch between them, and when the match is found, the circuit 136 outputs the EMM data 108.

The third detecting circuit 137 compares the third parameter 132 "012345h" to the information stored in the second field 111 of the EMM data 108 output from the first detecting circuit 135 or the second detecting circuit 136, to detect a match/mismatch between them, and when the match is found, the circuit 137 outputs the input EMM data 108.

The fourth detecting circuit 138 compares the fourth parameter 133 "0001h" to the information stored in the first field 110 of the received EMM data 108, to detect a match/mismatch between them, and when the match is found, the circuit 138 outputs the input EMM data 108. The fourth detecting circuit 139 compares the fourth parameter 134 "0002h," to the information stored in the first field 110 of the received EMM data 108, to detect a match/mismatch between them, and when the match is found, the circuit 139 outputs the input EMM data 108.

In other words, the first to fourth detecting circuits 135 to 139 filter the input. EMM data 108. When the EMM data is output from at least one of the third and fourth detecting circuits 137, and 138 and 139, the output unit 107 outputs the EMM data 108. As a result, a receiver 102 can receive only EMM data 108 which specifies itself as destination.

Although the fourth detecting circuits 138 and 139 are shown as being separate in FIG. 7 in order to explain operation of the data selecting apparatus 104, they may be configured by the same circuit.

More specifically, the following operation is performed in this data selecting apparatus 104.

The EMM data 108 is input to the first, second, and fourth detecting circuits 135, 136, 138, and 139. The first detecting circuit 135 checks whether there is a match between the information stored in the first field 110 and the first parameter 130 "0000h", and when there is the match between them (a correspondence pattern is detected), the EMM data 108 passes through the first detecting circuit 135. The second detecting circuit 136 checks whether there is a match between the information stored in the first field 110 and the second parameter 131 "FF67h", and when there is the match between them, the EMM data 108 passes through the second detecting circuit 136.

The EMM data 108 which has passed through the first detecting circuit 135 or the second detecting circuit 136 is input to the third detecting circuit 137, which checks whether there is a match between the information stored in the second field 111 and the third parameter 132 "012345h", and when there is the match between them, the EMM data 108 passes through the third detecting circuit 137. The output unit 107 outputs the EMM data 108 which has passed through these circuits 135, 136, and 137.

The fourth detecting circuit 138 compares the information stored in the first field 110 to the fourth parameter 133 "0001h", and when there is the match between them, the EMM data 108 passes through the fourth detecting circuit 138. The fourth detecting circuit 139 compares the information stored in the first field 110 of the EMM data 108 and the fourth parameter 134 "0002h", and when there is the match between them, the EMM data 108 passes through the fourth detecting circuit 139. The output unit 107 outputs the EMM data 108 which has passed through the fourth detecting circuit 138 or 139.

Substantially, broadcasting in the communication system 100 will be described.

First, in the transmitter (see FIG. 1), the data structuring unit 103 for the EMM data structures the EMM data 108 to be in one of the formats shown in FIGS. 2 to 5 and transmits the same to the receiver 102, where the EMM data 108 is selected as described below.

(1) Broadcasting for Specified Receiver

Assume that "01234567h" is set as the number of a specified receiver 102. Upper 3 bytes "012345h" of 4 bytes "01234567h" indicate a receiving group to which the specified receiver 102 belongs, and lower 1 byte "67h" indicates the number in the receiving group. Therefore, the receiver unique number "FF67h" and the group specifying number "012345h" are set in the first field 110 and the second field 111 of the EMM data 108 (see FIG. 2), respectively. Also assume that the second parameter 131 "FF67h", and the third parameter 132 "012345h" are respectively set in the parameter storage unit 105 of the data selecting apparatus 104 of one of the plural receivers 102.

The EMM data 108 is subjected to predetermined processing in the digital demodulating circuit 121, the packet selecting circuit 122, and the packet processing circuit 123, and is input to the section processing circuit 124, where the table ID field 109 of the EMM data 108 is checked by the section selecting circuit 125, and it is decided that this is EMM data when "84h". Then, the EMM data 108 is input to the data selecting apparatus 104. In this embodiment, since "84h" is stored in the table ID field 109, the EMM data 108 is input to the data selecting apparatus 104.

When the EMM data 108 is input to the data selecting apparatus 104, the information stored in the first field 110 is compared to the first parameter 130, the second parameter 131, and the fourth parameters 133 and 134 as already described with reference to FIG. 7. Since the receiver unique number "FF67h" and the group specifying number "012345h" are set in the first field 110 and the second field 111 of the EMM data 108, respectively, the "FF67h" matches the second parameter 131 of the receiver 102, so that the EMM data 108 passes through the second detecting circuit 136. Then, the group specifying number "012345h" of the second field 111 matches the third parameter 132 of the receiver 102, so that the EMM data 108 passes through the third detecting circuit 137 to the output unit 107, which outputs the EMM data 108.

As thus described, broadcasting for the specified receiver 102, among many receivers 102, can be provided. On the other hand, in a case where another number is set in a storage position of the receiver unique number or the group specifying number, since it is different from the second parameter 131 or the third parameter 132, the EMM data 108 will not be output from the output unit 107.

(2) Broadcasting for Specified Receiving Group

Assume that "012345h" is set in receivers 102 which belong to a specified group, as the number indicating a receiving group to which they belong. Therefore, the group destination number "0000h" and the group specifying number "012345h" are set in the first field 110 and the second field 111 of the EMM data 108 (see FIG. 3), respectively. Also assume that the first parameter 130 "0000h", and the third parameter 132 "012345h" are respectively set in the parameter storage unit 105 of the data selecting apparatus 104 of each of the receivers 102 in the receiving group.

When the EMM data 108 is input to the data selecting apparatus 104, the information stored in the first field 110 is compared to the first parameter 130, the second parameter 131, and the fourth parameters 133 and 134 as already described with reference to FIG. 7. Since the group destination number "0000h" and the group specifying number "012345h" are set in the first field 110 and the second field 111 of the EMM data 108, respectively, the "0000h" matches the first parameter 130 of the receiver 102, so that the EMM data 108 passes through the first detecting circuit 135. Then, the group specifying number "012345h" in the second field 111 of the EMM data 108 matches the third parameter 132 of the receiver 102, so that the EMM data 108 passes through the third detecting circuit 137 to the output unit 107, which outputs the EMM data 108. This operation is performed by all receivers 102 in the receiving group.

As thus described, broadcasting for all receivers 102 in the receiving group can be provided. On the other hand, in a case where another number is set in a storage position of the group destination number or the group specifying number, since it is different from the first parameter 130 or the third parameter 132, the EMM data 108 will not be output from the output unit 107.

(3) Broadcasting for all Receivers

Assume that the number for specifying all receivers "0001h" is set in the first field 110 of the EMM data 108 (see FIG. 4). Also assume that the fourth parameter 133 "0001h" is set in the parameter storage unit 105 of each of the data selecting apparatuses 104 of all receivers 102 in the digital communication system 100.

When the EMM data 108 is input to the data selecting apparatus 104, the information stored in the first field 110 is compared to the first parameter 130, the second parameter 131, and the fourth parameters 133 and 134 as already described with reference to FIG. 7. Since the number for specifying all receivers "0001h" is set in the first field 110 of the EMM data, this "0001h" matches the fourth parameter 133 of the receiver 102, so that the EMM data 108 passes through the fourth detecting circuit 138 to the output unit 107, which outputs the EMM data 108. Thus, broadcasting for all receivers can be provided. On the other hand, in a case where another number is set in a storage position of the number for specifying all receivers, since it is different from the fourth parameter 133, the EMM data 108 will not be output from the output unit 107.

(4) Broadcasting for Special Receiving Group

Assume that a special group number "0002h" is set in the first field 110 of the EMM data 108 (see FIG. 5). Also assume that the fourth parameter 134 "0002h" is set in the parameter storage unit 105 of the data selecting apparatus 104 of each of all receivers 102 in the special group.

When the EMM data 108 is input to the data selecting apparatus 104, the information stored in the first field 110 is compared to the first parameter 130, the second parameter 131, and the fourth parameters 133 and 134 as already described with reference to FIG. 7. Since the special group number "0002h" is set in the first field 110, this "0002h" matches the fourth parameter 134 of the receiver 102, so that the EMM data 108 passes through the fourth detecting circuit 139 to the output unit 107, which outputs the EMM data 108.

As thus described, broadcasting for the special group, namely, a receiving group comprising receivers under a contract of special service can be provided. On the other hand, in a case where another number is set in a storage position of the special group number, since it is different from the fourth parameter 134, the EMM data 108 will not be output from the output unit 107.

Although the aforementioned four cases (broadcasting for the specified receiver individually, broadcasting for the specified receiving group for each receiving group, broadcasting for all receivers, and broadcasting for the special group) have been described as being separate, both data of the broadcasting for all receivers and the broadcasting for the special group can be received provided that both "0001h" and "0002h" are set in the receiver 102 as the fourth parameters. Furthermore, the numbers of the fourth parameters and the fourth detecting circuits may be increased and plural kinds of special groups are set and detected, whereby data of broadcasting for plural special groups can be received.

Besides, the information of the first field 110 or the receiver unique number is illustrative and not restrictive. In addition, although the EMM data 108 is transmitted in a section data format in the above description, a data selecting apparatus which is capable of selecting data having another format may be employed. Further, although the data transmission in digital broadcasting according to MPEG system standard has been described, the data transmission is not restricted thereto, and is applicable to a case where data comprising plural fields is selected.

As should be appreciated from the foregoing description, in accordance with the preferred embodiment of the present invention, in digital broadcasting in which various types of data is multiplexed and transmitted, it is possible to realize the followings: i) Data is sent to receivers to which data is to be transmitted ii) Data is sent to the whole receiving group obtained by grouping receivers by their individual numbers iii) The same data is sent to all receivers simultaneously iv) Data is sent to all receivers which belong to each of groups obtained by grouping receivers on a service basis according to contract of broadcasting service. As a consequence, destination can be specified flexibly in the data transmission, whereby the number of times of transmission of the same data is significantly reduced and efficiency in the use of the transmission bandwidth is greatly improved, as compared with a case where data is transmitted only to one receiver.

Furthermore, in accordance with the preferred embodiment of the present invention, since the receiver unique number for identifying the destination receiver of the EMM data is composed of the group specifying information indicating the receiving group to which the destination receiver belongs and the in-group identification information for identifying the receiver in the receiving group, and the in-group identification information is included in the group destination directing information of the EMM data, it is possible to make a decision on the group destination directing information, and simultaneously on whether there is a match of the in-group identification information. Therefore, when the EMM data is selected by the data selecting circuit, the match of the group specifying information is detected by a single detecting circuit (third detecting circuit) irrespective of group destination or individual receiver destination, resulting in reduced amount of processing required for deciding whether to receive the EMM data. As a consequence, the EMM data can be selected with a small scale circuit.

INDUSTRIAL AVAILABILITY

Using the digital communication system, the transmitter, and the data selecting apparatus of the present invention, data is sent to specified receivers, and all receivers or prescribed receiving groups simultaneously, which can improve degree of freedom with which data destination is specified and achieve efficiency in the data transmission bandwidth.

What is claimed is:

1. A digital communication system comprising:
   a transmitter operable to sequentially transmit predetermined format data; and
   a plurality of receivers each including a data selecting apparatus operable to select required data from received data group and to output selected data,
   wherein said transmitter is further operable to transmit data to said receivers in one of a first transmission mode, and a second transmission mode and a third transmission mode,
   wherein in the first transmission mode, group destination assignment information indicating whether the data is transmitted to a specified receiver of said plurality of receivers, to a group consisting of specified plural receivers, or to all receivers, group specifying information for specifying a receiving group of receiving groups to which the data is to be transmitted, and in-group identification information for identifying a receiver to which the data is transmitted, in a receiving group which is specified by the group specifying information, are included in the data, and the group destination assignment information in the first transmission mode indicates that the data is transmitted to a specified receiver of said plurality of receivers,
   wherein in the second transmission mode, the group destination assignment information and the group specifying information are included in the data, and the group destination assignment information and the group specifying information in the second transmission mode indicates that the data is transmitted to a group consisting of specified plural receivers,
   wherein in the third transmission mode, the group destination assignment information is included in the data, and the group destination assignment information in the third transmission mode indicates that the data is transmitted to all receivers or to a group consisting of plural receivers which are specified by the group destination assignment information,
   wherein said transmitter includes data structuring means for structuring data to be transmitted,
   wherein said data selecting apparatus includes: parameter storage means for prestoring plural parameters which are to be compared to the group destination assignment information, the in-group, identification information, and the group specifying information: correspondence pattern detecting means for comparing the information stored in the data to the parameters, respectively to detect correspondence patterns; and output means for selecting the required data according to the correspondence patterns detected by the correspondence pattern detecting means and outputting the selected data,
   wherein the group destination assignment information includes a group destination number indicating that the second transmission mode is used to be transmitted when the data to be transmitted is destined for the group,
   wherein the group destination assignment information includes a specified receiver destination number indicating that the first transmission mode is used to be transmitted when the data to be transmitted is destined for the specified receiver,
   wherein said parameter storage means is operable to prestore a first parameter to be compared to the group destination number, a second parameter to be compared to the specified receiver destination number and the in-group identification information, and a third parameter to be compared to the group specifying information,
   wherein said correspondence pattern detecting means is operable to:
   detect transmission being performed in the first transmission mode and indicating that the transmitted in-group identification information is a data to be received, when the specified receiver destination number and the in-group identification information match the second parameter;
   judge that the first correspondence pattern is detected, when the group specifying information matches the third parameter in the first transmission mode;
   detect transmission being performed in the second transmission mode, when the group destination number matches the first parameter; and
   judge that the second correspondence pattern is detected, when the group specifying information matches the third parameter, and
   wherein said output means is operable to select the required data according to one of the first and second correspondence patterns and outputs the selected data.

2. The digital communication system of claim 1, wherein the group destination assignment information includes all specifying numbers indicating that the third transmission mode is used to be transmitted when the data to be transmitted is destined for the all receivers, wherein said parameter storage means is further operable to prestore a fourth parameter to be compared to the all specifying numbers wherein said correspondence pattern detecting means is further operable to detect transmission being performed in the third transmission mode and to judge that being a data to be received, when detecting a third correspondence pattern that the number for specifying all receivers matches the fourth parameter in the third transmission mode, and wherein said output means is further operable to select the required data according to the third correspondence pattern and to output the selected data.

3. The digital communication system of claim 2, wherein group destination assignment information includes a special group number when the data to be transmitted is destined for all receivers which belong to a special group, when the data to be transmitted is destined for all receivers which belong to the special group, wherein said parameter storage means is further operable to prestore a fourth parameter to be compared to the special group number, wherein said correspondence pattern detecting means is further operable to detect transmission being performed in the third transmission mode and to judge that the special group number is a data to be received, when detecting a fourth correspondence pattern that the special group number matches the fourth parameter in the third transmission mode, and wherein said output means is further operable to select the required data according to the fourth correspondence pattern and to output the selected data.

4. A data selecting apparatus adapted to be incorporated in a receiver in a digital communication system, which is operable to be supplied with predetermined format data as inputs and is operable to select required data from input data group and to output selected data said apparatus comprising:

parameter storage means for presetoring plural parameters which are to be compared to group destination assignment information in the data indicating whether the data to be transmitted is transmitted to a specified receiver of said plurality of receivers, to a group consisting of specified plural receivers or to all receivers, group specifying information in the data for specifying a receiving group of receiving groups to which the data is transmitted, and in-group identification information in the data for identifying a receiver to which the data is to be transmitted, in a receiving group which is specified by the group specifying information;

correspondence pattern detecting means for comparing the information stored in the data to the parameters, respectively, to detect correspondence patterns; and output means for selecting the required data according to the correspondence patterns detected by said correspondence pattern detecting means and outputting the selected data, and wherein the group destination assignment information includes a group destination number indicating that the second transmission mode is used to be transmitted when the data to be transmitted is destined for the group, wherein the group destination assignment information includes a specified receiver destination number indicating that the first transmission mode is used to be transmitted when the data to be transmitted is destined for the specified receiver, wherein said parameter storage means is operable to prestore a first parameter to be compared to the group destination number, a second parameter to be compared to the specified receiver destination number and the in-group identification information, and a third parameter to be compared to the group specifying information, wherein said correspondence pattern detecting means is operable to:

detect transmission being performed in the first transmission mode and indicating that the transmitted in-group identification information is a data to be received, when the specified receiver destination number and the in-group identification information match the second parameter;

judge that the first correspondence pattern is detected, when the group specifying information matches the third parameter; to detect transmission being performed in the second transmission mode, when the group destination number matches the first parameter; and judge that the second correspondence pattern is detected, when the group specifying information matches the third parameter, and said output means is operable to select the required data according to one of the first and second correspondence patterns and to output the selected data.

5. The data selecting apparatus of claim 4, wherein the group destination assignment information includes all specifying numbers indicating that the third transmission mode is used to be transmitted, when the data to be transmitted is destined for the all receivers, wherein said parameter storage means is further operable to prestore a fourth parameter to be compared to the all specifying numbers, wherein said correspondence pattern detecting means is further operable to detect transmission being performed in the third transmission mode and to judge that being a data to be received, when detecting a third correspondence pattern that the number for specifying all receivers matches the fourth parameter, and wherein said output means is further operable to select the required data according to the third correspondence pattern and to output the selected data.

6. The data selecting apparatus of claim 4, wherein the group destination assignment information includes a special group number indicating that the data to be transmitted is destined for all receivers which belongs to a special group, when the data to be transmitted is destined for the all receivers which belong to the special group, wherein said parameter storage means is further operable to prestore a fourth parameter to be compared to the special group number, wherein said correspondence pattern detecting means is further operable to detect transmission being performed in the third transmission mode and to judge that the special group number is a data to be received, when detecting a fourth correspondence pattern that the special group number matches the fourth parameter, and wherein said output means is further operable to select the required data according to the fourth correspondence pattern and to output the selected data.

* * * * *